United States Patent Office 3,392,557
Patented July 16, 1968

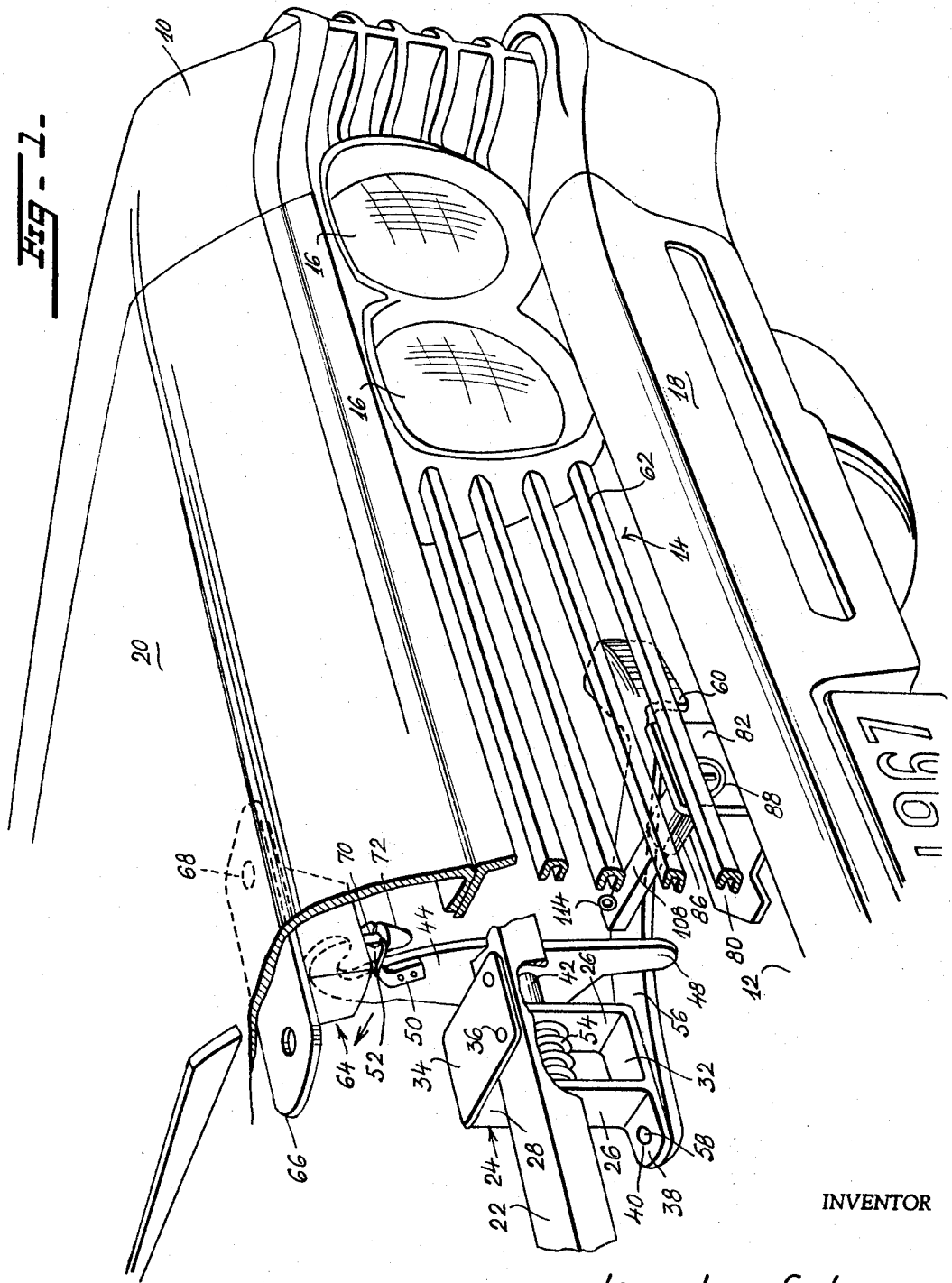

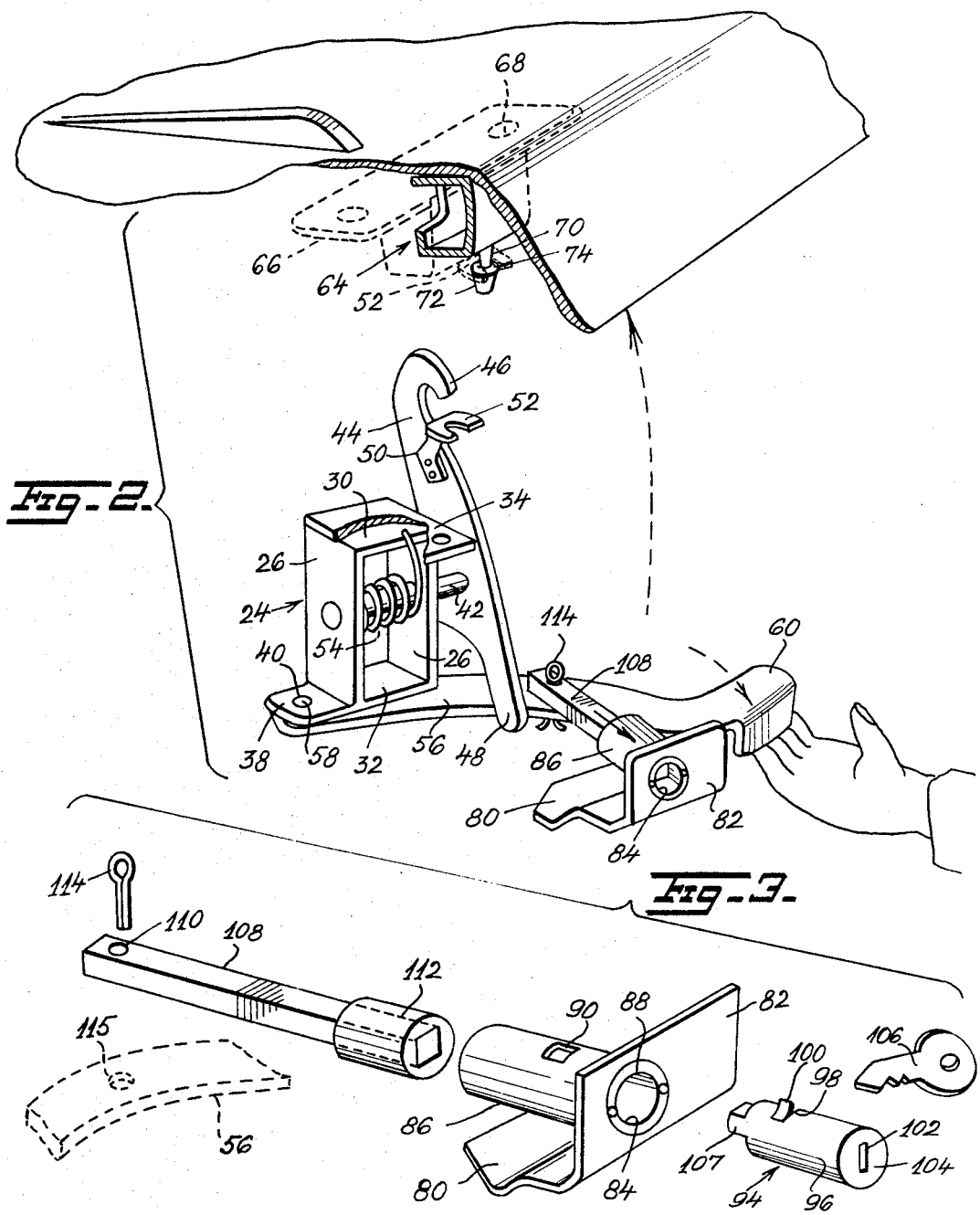

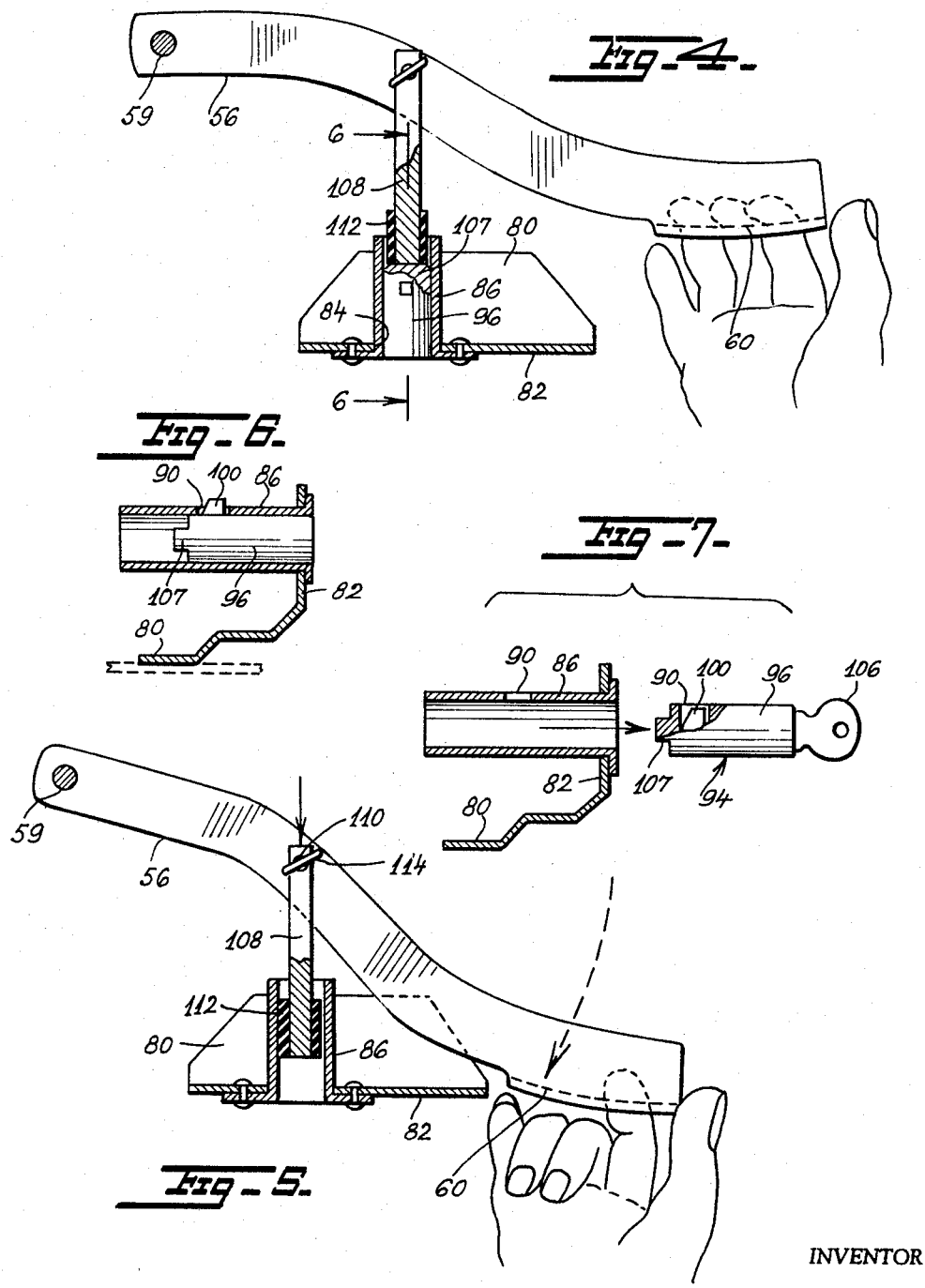

3,392,557
LOCKING DEVICE FOR AUTOMOBILE HOODS
Joseph Solow, Box 116, Plainview, N.Y. 11803
Filed May 10, 1967, Ser. No. 637,611
9 Claims. (Cl. 70—240)

ABSTRACT OF THE DISCLOSURE

A lock device for the hood of an automobile consisting of a tubular socket attached to the chassis, a movable bar connected to the latching lever of the hood and slidably mounted in said socket to coact with a cylinder lock which is removably mounted in the other end of said socket.

Summary of invention

An attachment for an automobile in the form of a locking device for releasably holding the hood locking mechanism against unauthorized opening operations. The locking device comprises a sheet metal supporting bracket adapted to be fastened to a stationary part of the chassis at the front thereof. The bracket is formed with a flat body and an upstanding flange formed with an opening therein at one end thereof. One end of a tubular socket extends through the opening and is suitably fixed to the edge wall thereof. The socket is formed with an opening in the side wall thereof intermediate its ends. The socket houses removably locking mechanism of the tumbler type. The tumbler locking mechanism has a cylindrical barrel with the locking mechanism inside. The latter locking mechanism includes a movable lug which extends through the opening in the socket to interlock the socket and removable locking mechanism therein and thus prevents removal of said locking mechanism from the socket. A connecting bar is pivotally connected at one end to the lever that actuates the locking and unlocking mechanism of the hood. The other end of the bar is slidably mounted in the inner open end of the socket and is adapted to abut against the inner end of the tubular barrel of the locking mechanism in the socket thereby preventing the sliding movement of the bar and consequent preventing movement of the actuating lever of the hood locking mechanism. A key is provided for releasing the lug locking the socket and inner tubular locking mechanism in order to remove the tumbler locking mechanism from the socket to permit actuating of the lever for opening the hood.

Brief description of the views of the drawings

FIGURE 1 is a perspective view of the front of an automobile showing the hood in closed and locked position and showing the hood holding mechanism equipped with a locking device embodying the present invention, parts being shown broken away.

FIG. 2 is a fragmentary disassembled perspective view of the hood holding mechanism and locking device moved to open and unlocked position and showing the hood in raised open position.

FIG. 3 is a disassembled perspective view of the improved locking device, a portion of the actuating lever of the hood holding mechanism being shown in dash lines.

FIG. 4 is a top plan view of the actuating lever of the hood holding mechanism and locking device, the lever being shown in locked position, parts being shown broken away and parts in section.

FIG. 5 is a view similar to FIG. 4 but showing the actuating lever in unlocked position.

FIG. 6 is a vertical sectional view taken on the plane of the line 6—6 of FIG. 4.

FIG. 7 is a disassembled part elevational and part sectional view of the socket and tumbler locking mechanism of the locking device, parts being shown broken away.

Detailed description of the drawings

Referring now in detail to the various views of the drawings wherein similar reference numerals are used to indicate similar parts, in FIG. 1 there is shown the front of an automobile 10, the front portion of the chassis 12 being shown supporting the metal grill work 14 at the front. A pair of lamps 16, 16 is shown supported by the grill work. A front fender 18 is shown mounted on the chassis. A conventional movable hinged hood 20 is shown in closed position.

The mechanism shown for holding the hood 20 in closed position includes an elongated angle bar 22 extending from one of the sides (not shown) of the chassis adjacent the front thereof. A box-like casing 24, having side walls 26, 26, back wall 28, top and bottom walls, 30 and 32, respectively, and open at the front, is suspended from the bar 22 by means of a plate 34 secured to the top wall 30 of the housing and overhanging the bar 22, the plate being fixed to the bar by rivets 36. The bottom wall 32 is formed with a lateral extension 38 having a central hole 40. A stub shaft 42 is journalled in holes in the opposed side walls 26, 26 extending outwardly of one of said side walls. A lever 44 is fixed on the extending end of shaft 42 disposed in vertical position with a hook 46 at one end and a reduced portion forming a handle 48 on the other end. A bracket 50 is secured at one end to the side surface of the body of the lever 44. The other end of bracket 50 is formed with a bifurcated plate 52 disposed underneath the hook 46 and in line therewith. A coil spring 54 is sleeved around the stub shaft 42 with one end impinging against the top wall 30 of the casing 24 and its other end fixed on the stub shaft 42 whereby the shaft and lever are urged in a clockwise direction as viewed in FIG. 2 for holding the hood in closed position.

Mechanism is provided for manually swinging the lever 44 to hood opening position. For this purpose, an elongated curved lever 56 of metal bar material has one end pivotally connected to the lateral extension 38 of the bottom wall 32 of the casing 24 by means of a pivot pin 58 extending through a hole 59 in the end of the lever and through the hole 40 in the extension 38. The lever 56 at its pivoted end extends transversely of the space between the sides of the chassis and then curves and extends forwardly of the space to a point adjacent the grill work 14 where it is formed with a hand piece 60 for manipulating the same. The hand piece is within easy reach of the hand of the operator between the bars 62 of the grill work. The bottom handle 48 of the lever 44 is in the path of movement of the lever 56 so that when the lever 56 is normally manually pivoted in a clockwise direction as viewed in FIG. 1, it strikes the handle 48 of the lever 44 and tilts it in its pivot shaft 42 thereby moving the bifurcated plate 52 away from the rod and head breaking the lock between the head and chassis.

A bracket 64 depends from the hood at the juncture of the horizontal and downwardly slanting portions thereof when the hood is closed. The bracket has a hollow body with tapered side and end walls, a bottom wall and a top wall, the top wall having extensions 66 with holes therein for securing the bracket to the undersurface of the hood by means of rivets 68. A short round rod 70 depends from the bottom wall of the bracket and terminates at its bottom end in a conical shaped head 72 defining a shoulder 74. When the hood is in closed position, the rod with head 72 is in front of the bifurcated plate 52 of bracket 50 on lever 44 disposed in the path of swinging movement of the lever 44 so that when the lever is swung clockwise as viewed in FIG. 2, the bifurcated plate 52 interlocks with the round rod 70 and shoulder 74 on the head 72, as seen in FIG. 1, in order to lock the hood against upwardly opening movement.

In accordance with the present invention, apparatus is provided for locking the hood-opening mechanism so that unauthorized persons cannot open the hood. This locking mechanism includes a sheet metal plate 80 to the front of the chassis 12 by welding, or in any other suitable manner. The plate 80 is formed with an upward flange 82 along one long edge thereof. The flange 82 is formed with an opening 84. An elongated metal tubular socket 86 has one end secured to the flange 82 by an annular flange 82 riveted to the flange 82. The body of the socket extends inwardly of the chassis and is open at the inner end. The side wall of the body of the tubular socket 86 is formed with a hole 90.

Locking mechanism 94 is adapted to be removably mounted as a unit in the body of the tubular socket 86 from the outer flanged end thereof. The mechanism 94 includes a metal cylindrical barrel 96 housing locking mechanism of the tubular type (not shown) therein. A hole 98 is formed in the barrel to make clearance for a spring-pressed bolt 100 normally extending outwardly of the barrel and forming part of the locking mechanism. A slot 102 in the end wall 104 of the barrel permits insertion of a key 106 for actuating the locking mechanism inside the barrel, whereby the bolt 100 is adapted to be moved to locking and unlocking positions. The other end of the barrel is formed with a reduced portion 107.

An enlarged metal bar 108, square in cross-section, is formed with a hole 110 at one end and is covered at its other end with a rubber sleeve 112. The perforated end of the bar 108 is removably attached to the lever 56 midway its ends by a cotter pin 114 extending through the hole 110 and a similar hole 115 in the lever 56. The free end of the bar 108, mounting the sleeve 112, slidably fits in the inner open end of the tubular socket 86 and abuts again the reduced end portion 107 of the barrel 96.

In operation, when the barrel 96 containing the locking mechanism is inside the tubular socket 86 and the bolt 100 is extending through the hole 90 in the socket 86, the actuating lever 56 for actuating the lever 44 and moving it to unlocking position cannot be moved as the bar 108 attached to the lever 56 cannot move longitudinally in the socket 86 as it is prevented by the barrel 96 in the socket. In order to permit movement of the actuating lever 56, it is necessary to remove the barrel from the socket and this can only be done by use of the key 106 for breaking the interlock between the bolt 100 and the socket 86. When the interlock is broken, the bar 108 may slide inwardly of the socket thereby permitting the actuating lever 56 to swing and engage the handle 48 on the lever 44 for unlocking the hood.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A locking device for locking the hood of an automobile in closed position to the chassis of the automobile, in combination with mechanism in common for opening the hood and for holding the hood in closed position, said locking device including a flat generally rectangular sheet body adapted to be fixed to the chassis at the front thereof, an upright flange along one long edge of the sheet metal body, said flange having an opening therein, a tubular socket supported by the flange in alignment with said opening, said socket open at both ends and having an opening midway its ends, a barrel removably mounted in the open front end of the socket, locking mechanism of the tumbler type in the barrel including a bolt movable into and out of the opening in the tubular socket for interlocking the hood and chassis, means for actuating the locking mechanism in said barrel whereby the bolt is moved into and out of the opening in the tubular socket, and an elongated bar slidable in the other end of the socket and adapted to coact with the barrel in the socket, said bar provided with means for detachable attachment to a moving part of the mechanism for holding the hood closed whereby the hood opening mechanism is prevented from hood opening movement.

2. A locking device for locking the hood of an automobile in closed position to the chassis of the automobile as defined in claim 1, wherein the means for actuating the locking mechanism in the barrel is constituted by a slot in the barrel leading to said locking mechanism and a key adapted to be inserted into said slot for actuating said locking mechanism for moving said bolt.

3. A locking device for locking the hood of an automobile in closed position to the chassis of the automobile as defined in claim 1, wherein the barrel has a reduced portion at one end coacting with the inserted end of the slidable bar.

4. A locking device for locking the hood of an automobile in closed position to the chassis of the automobile as defined in claim 1, wherein the elongated slidable bar has a sleeve on one end thereof for insertion into the open end of the tubular socket.

5. A locking device for locking the hood of an automobile in closed position to the chassis of the automobile as defined in claim 1, wherein the means for detachable attachment of the bar to a moving part of the hood holding mechanism is constituted by a hole in an end of the bar and a cotter pin insertable in said hole and in a hole in said hood holding mechanism.

6. A locking device for locking the hood of an automobile in closed position to the chassis of the automobile as defined in claim 1, wherein the barrel has a reduced portion at one end coacting with the inserted end of the slidable bar and wherein the elongated slidable bar has a sleeve on one end thereof for insertion into the open end of the tubular socket.

7. A locking device for locking the head of an automobile in closed position to the chassis of the automobile as defined in claim 6, wherein the means for detachable attachment of the bar to a moving part of the hood holding mechanism is constituted by a hole in an end of the bar and a cotter pin insertable in said hole and in a hole in said hood holding mechanism.

8. A locking device for locking the hood of an automobile in closed position to the chassis of the automobile as defined in claim 2 wherein the barrel has a reduced portion at one end coacting with the inserted end of the slidable bar and wherein the elongated slidable bar has a sleeve on one end thereof for insertion into the open end of the tubular socket.

9. A locking device for locking the hood of an automobile in closed position to the chassis of the automobile as defined in claim 8 wherein the means for detachable attachment of the bar to a moving part of the hood holding mechanism is constituted by a hole in an end of the bar and a cotter pin insertable in said hole and in a hole in said hood holding mechanism.

References Cited

UNITED STATES PATENTS 2,065,683   12/1936   Gahagan _____ 70—369

FOREIGN PATENTS 1,327,087   4/1963   France.

MARVIN A. CHAMPION, *Primary Examiner.*

R. L. WOLFE, *Assistant Examiner.*